J. D. BOLENDER AND E. R. CREAMER.
MOLDING FOR UPHOLSTERING.
APPLICATION FILED APR. 11, 1921.
1,387,639. Patented Aug. 16, 1921.
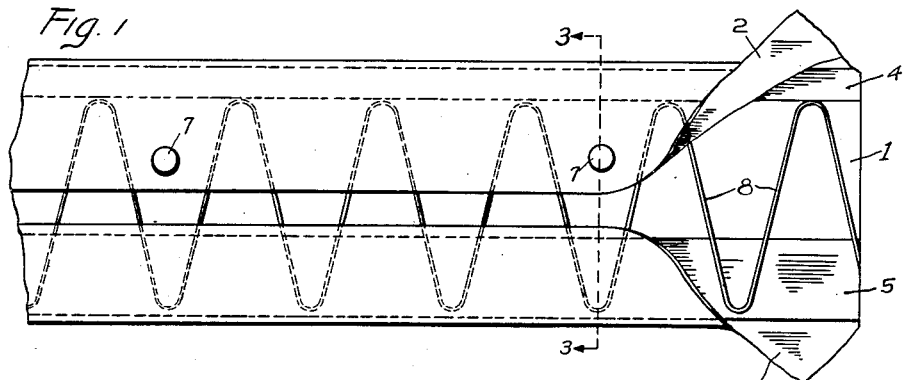
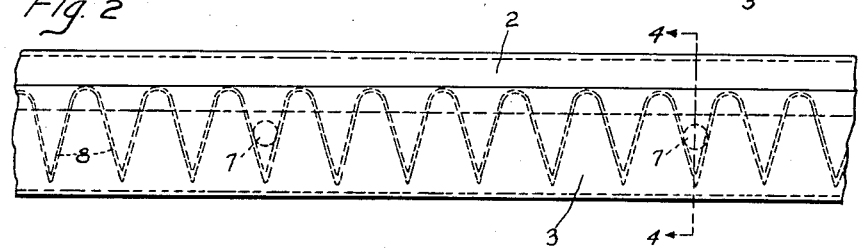
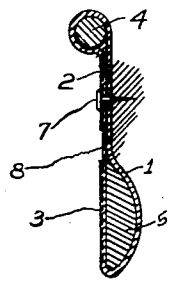
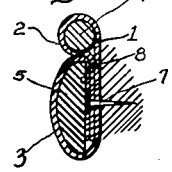
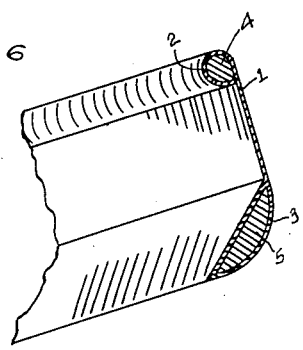
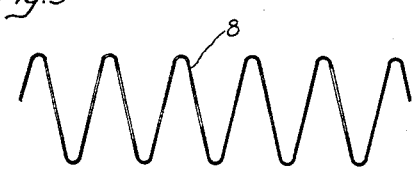

UNITED STATES PATENT OFFICE.

JOEL D. BOLENDER AND EDGAR R. CREAMER, OF CONNERSVILLE, INDIANA, ASSIGNORS TO THE GEORGE R. CARTER COMPANY, OF CONNERSVILLE, INDIANA, A CORPORATION OF INDIANA.

MOLDING FOR UPHOLSTERING.

1,387,639.  Specification of Letters Patent.  Patented Aug. 16, 1921.

Application filed April 11, 1921. Serial No. 460,485.

*To all whom it may concern:*

Be it known that we, JOEL D. BOLENDER and EDGAR R. CREAMER, citizens of the United States, residing at Connersville, in the county of Fayette and State of Indiana, have invented certain new and useful Improvements in Moldings for Upholstering, of which the following is a specification.

This invention relates to improvements in molding for upholstering, it relating more particularly to that class of molding so designed that the devices which secure it in position are concealed.

Numerous attempts have been made to design a molding of this character, but in all prior examples so far as applicants are aware, it is either necessary, in applying the molding, to temporarily bend back from normal position the concealing portions of the molding, or else provide for holding the concealing portions of the molding in position after the tacks or other fastening devices have been applied by glue or other adhesive substance which makes removal difficult.

The object of our improvement is to provide a molding having a concealing portion which, after the securing devices, such as tacks, have been applied, may be readily bent over the securing devices and held in that position by its own resiliency without the aid of any additional holding means.

A further and more specific object of our invention is to provide a molding having incorporated therein as a part thereof a layer of flexible stiffening material of a character which will retain the molding in an open or flat position while being applied to the upholstering and will also act to retain the molding in a folded position, or in a position in which part of the molding is bent upon the other, for the purpose of concealing the fastening devices.

A further object of our invention is to provide a molding which is simple in construction, effective for the purpose for which it is designed, and economical in manufacture.

In the accompanying drawings:—

Figure 1 is a plan view of a portion of a molding embodying our improvements in flat or unfolded position, the view being on an enlarged scale.

Fig. 2 is a plan view of the same in folded position.

Fig. 3 is a section on the line 3—3 of Fig. 1.

Fig. 4 is a section on the line 4—4 of Fig. 2.

Fig. 5 is a plan view of the flexible stiffening material on a smaller scale than shown in the other figures.

Fig. 6 is a perspective view showing the parts in unfolded position.

Referring to the drawings, there is shown a strip of material of which 1 represents the central or main body portion and 2 and 3 the respective edge portions arranged to be folded upon the main portion; this strip being formed of leather, fabric or any other material suitable to be used for a molding of this character, which is one particularly adapted for trimming the upholstering of automobile bodies, but not necessarily limited to that purpose.

The edge 2 is wrapped about a bead 4 of flexible material such as paper fabric and it is secured to the main body portion preferably by gluing. The edge portion 3 is folded about a core 5, preferably of leather and is secured to one side thereof preferably by gluing; the core being also preferably glued to the main portion 1 of the strip.

Inserted between the edge portion 3 and the core 5 and also between the wing 2 and the main body portion 1 is a flexible stiffening substance which in the present case we have shown in the form of a wire which is bent in zigzag fashion; the peculiar construction of the wire not only permitting it to bend but also elongate and contract.

The finished molding is in the form shown in Figs. 1 and 2 so that in applying the molding the securing devices which may be ordinary flat-headed tacks 7, may be readily driven to position through the wing portion 2 and main body portion 1, after which the core 5 with the main inclosing body portion 1 and wing portion 3 are bent over to the position shown in Figs. 2 and 4, the flexible wire readily bending with its inclosing parts and having sufficient rigidity to maintain the parts in folded position to thereby conceal the tacks.

By the arrangement described, it will be seen that the molding may be easily applied to the upholstering while in its unfolded position, and by reason of the flexible character of the parts, including the stiffening wire, may be readily bent about curves or corners; that after the molding is secured, the concealing portion thereof may be readily folded over to proper position; and that the arrangement also results in a molding of attractive appearance and one which can be economically manufactured.

Having thus described, our invention, we claim:—

1. In a device of the character described, a flexible body arranged to be folded, and a layer of flexible stiffening substance inclosed by said body and folded therewith of a character to maintain said body in folded position.

2. In a device of the character described, a flexible body arranged to be folded, together with means for securing the body in position, and a layer of flexible stiffening substance inclosed by said body and folded therewith of a character to maintain said body in folded position over said securing means.

3. In a device of the character described, a strip of flexible material having its side edges folded upon the central portion, a layer of flexible stiffening substance inclosed between the main body of said material and its folded over edges, the main body of said material together with its edges being arranged to be folded upon each other and the stiffening material thereby bent therewith to hold the parts in folded position.

4. In a device of the character described, a body of flexible material arranged to be folded together with securing devices for the same, and a layer of flexible stiffening substance carried by said body of a character to hold the body in unfolded position while being secured to position and to be folded therewith to maintain said body in folded position to conceal the securing devices.

5. In a device of the character described, a strip of flexible material having its side edges folded upon the main body portion thereof, and a core of flexible material inclosed by said main body portion and one of said edges, a strip of flexible stiffening substance inclosed by the main body portion and the side edges, said core and the inclosing portions of the strip being arranged to be bent upon the other side edge whereby the flexible stiffening strip will be bent to act to retain the parts in folded position.

6. In a device of the character described, a strip of flexible material having its side edges bent upon the main body portion and a core of flexible material inclosed by the main body portion and said side edges, a bead of flexible material inclosed by the main body portion and the other side edge, and a strip of flexible stiffening substance inclosed in said material, said cored portion being arranged to be folded upon the other portion whereby the stiffening substance will be bent therewith in acting to retain the parts in folded position.

7. In a device of the character described, a flexible body arranged to be folded upon itself, and a layer of wire arranged in zigzag fashion carried by said body and folded therewith to maintain said body in folded position.

8. In a device of the character described, a flexible body, and a flexible stiffening substance carried thereby, said body and substance capable of being folded together, the stiffening substance being of a character to maintain the body in folded or unfolded position and also permit the body to be bent or curved in applying the same.

9. The method of folding parts of an article by securing to same a stiffening device, capable of being bent for folding purposes and also being stretched or elongated substantially as specified.

10. The method of folding parts of an article by securing to an edge thereof non-stretchable filler substances and securing to said article a stiffening device, part of same bearing against said filler substance, but capable of being bent and also elongated for the purpose specified.

11. The method of folding parts of a fabricated article formed with beaded edges, having a less flexible filler therein by first securing a stiffening device such that the ends of the stiffening device bear against said filler substance, and thereafter bending the stiffening device to folded position and also stretching or elongating the intermediate part of the said stiffening device for the purpose specified.

12. The method of folding parts of a fabricated article by securing to same a stiffening device, normally unflexed but capable of being flexed and also expansible and contractible, and thereafter flexing same to cause the folding parts of the article to remain in any desired position while the article and stiffening device are expanded or contracted for the purpose specified.

13. The method of folding parts of an article by securing to said article a stiffening device, capable of being bent for folding purposes and also capable of being expanded and contracted at any part thereof independent of other parts for the purpose specified.

14. In a device of the character described, a body portion foldable upon itself, a flexible stiffening member foldable with the body portion to hold same in folded position, and securing devices insertible through said body portion and stiffening member, said stiffening member being of open formation to permit said securing devices to be inserted through open portions thereof.

In testimony whereof, we have hereunto set our hands this 30th day of March, 1921.

JOEL D. BOLENDER.
EDGAR R. CREAMER.

Witnesses:
H. A. CARTER,
JAS. R. CARTER.